United States Patent
Han et al.

(10) Patent No.: US 9,946,866 B2
(45) Date of Patent: Apr. 17, 2018

(54) UNATTENDED SECURE DEVICE AUTHORIZATION

(71) Applicant: NCR Corporation, Duluth, GA (US)

(72) Inventors: Richard Han, Angus (GB); Andrew J. Wurfel, Smyrna, GA (US)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 14/973,978

(22) Filed: Dec. 18, 2015

(65) Prior Publication Data

US 2016/0103990 A1 Apr. 14, 2016

Related U.S. Application Data

(62) Division of application No. 14/193,493, filed on Feb. 28, 2014, now Pat. No. 9,311,473.

(51) Int. Cl.
*G06F 21/44* (2013.01)
*G06F 21/82* (2013.01)

(52) U.S. Cl.
CPC .............. *G06F 21/44* (2013.01); *G06F 21/82* (2013.01)

(58) Field of Classification Search
None
See application file for complete search history.

(56) References Cited

U.S. PATENT DOCUMENTS

| 6,009,527 | A  | * | 12/1999 | Traw | ........................ | G06F 21/71 |
|---|---|---|---|---|---|---|
|  |  |  |  |  |  | 710/8 |
| 2005/0021996 | A1 | * | 1/2005 | Howard | ................. | G06F 21/445 |
|  |  |  |  |  |  | 726/26 |
| 2005/0152305 | A1 | * | 7/2005 | Ji | ............................ | H04L 45/54 |
|  |  |  |  |  |  | 370/328 |
| 2010/0333202 | A1 | * | 12/2010 | Von Der Lippe | ..... | G06F 21/554 |
|  |  |  |  |  |  | 726/22 |
| 2014/0032907 | A1 | * | 1/2014 | Smith | .................. | H04L 9/3252 |
|  |  |  |  |  |  | 713/168 |

* cited by examiner

*Primary Examiner* — Fatoumata Traore
(74) *Attorney, Agent, or Firm* — Schwegman, Lundberg & Woessner

(57) ABSTRACT

Unattended secure device authorization techniques are provided. An operating system (OS) module, which is responsible for device validation when that device is interfaced to a host device, is enhanced. The enhanced OS module silently checks the peripheral device's identifier against a white list and if a match occurs, the enhanced OS module grants permission to the host device applications; if no match occurs, the enhanced OS module silently rejects application access to the device. In an embodiment, the enhanced OS module interacts with the device to determine whether the device is to be authorized or rejected.

6 Claims, 4 Drawing Sheets

UNATTENDED SECURE DEVICE AUTHORIZATION

CROSS-REFERENCE TO RELATED APPLICATION

The present application is a divisional application and claims the benefit of the filing date of application Ser. No. 14/193,493, filed Feb. 28, 2014, entitled, "Unattended Secure Device Authorization".

BACKGROUND

Most operating systems (OSs) default behavior for authorization of peripheral devices (interfaced to a host device having the OSs) are to present popup windows for the users to accept or decline permission for access to the peripherals upon host device connection.

This can be unacceptable for an unattended operation (an operation processing when no user is present to accept or decline the OS-presented accept or deny request (permission) of the popup window). Such a situation could prevent the host device from automatically starting an application, which may be needed for the host device before starting that application.

Moreover, in many cases the user permission needs to be renewed after application installation. So, even if permission was granted (during a user-attended situation to provide peripheral permission) and the application is executing normally on the host device, if the application is subsequently upgraded/updated (which could occur automatically by the OS when the user is not present) then the issue resurfaces on the upgrade/update of the application when the user is not present to provide the needed OS permission.

There are also general concerns around the connection of unauthorized peripheral devices being connected to a host device/host system, such as:

1) security because connecting unauthorized hardware may be an attempt to get the OS to automatically perform some unauthorized action on the host device (such as installation of spyware, malware, etc.); and 2) parts protection because some secure host devices/systems may only authorize peripherals from known vendors, such that the secure device/system: may operate improperly with other vendor products, may expose security holes, and may be detrimental to the products and reputation of the known vendors.

SUMMARY

In various embodiments, methods and system unattended secure device authorization for host devices are presented.

According to an embodiment, a method for unattended secure device authorization for a host device is provided. A coupled device is detected as being connected to a host device. A device identifier, which is acquired from the device, is checked against authorized device identifiers. Application access to the device is silently granted when the device identifier is one of the authorized device identifiers. Application access is silently denied when the device identifier is unmatched in the authorized device identifier.

DETAILED DESCRIPTION

Figure 1:
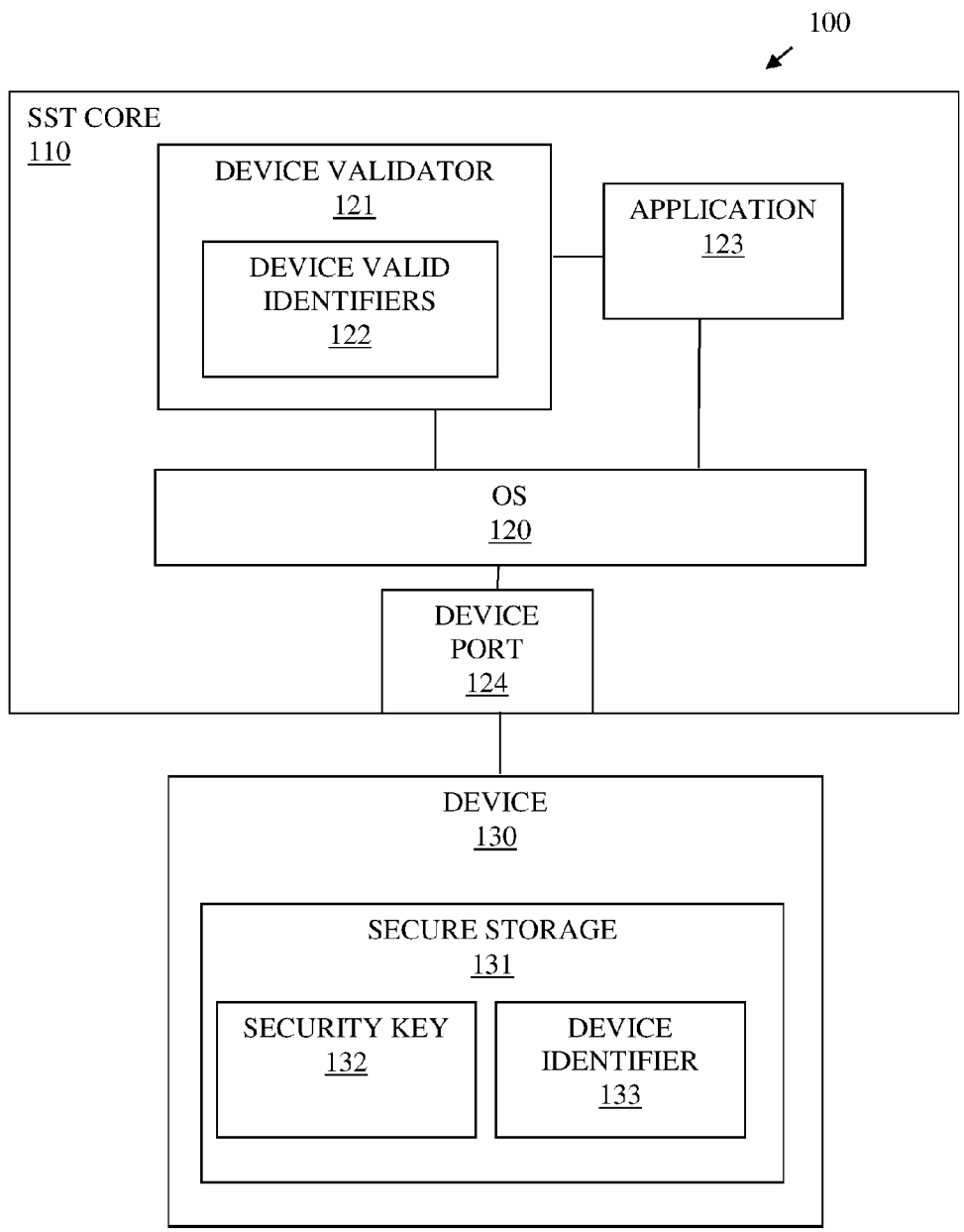
FIG. 1 is a diagram of a Self-Service Terminal (SST) for practicing unattended secure device authorization according to an example embodiment.

FIG. 1 is a diagram of an SST 100 that practices unattended secure device authorization on a Self-Service Terminal (SST), according to an example embodiment. The SST 100 is shown schematically in greatly simplified form, with only those components relevant to understanding of this embodiment being illustrated. The same is true for the other components depicted for the SST 100. The various components are illustrated and the arrangement of the components is presented for purposes of illustration only. It is to be noted that other arrangements with more or less components are possible without departing from the unattended secure device authorization techniques presented herein and below.

The techniques, methods, system, and SST 100, presented herein and below, for unattended secure device authorization can be implemented in whole or in part in one, all, or some combination of the components shown with the FIG. 1. The techniques and methods are programmed as executable instructions in memory and/or non-transitory computer-readable storage media and processed on one or more processors associated with the components (may also be referred to as "modules").

The SST 100 includes a SST core 110 and a device 130. The SST core 110 also includes an operating system (OS) 120, a device validator 121 having device valid identifiers 122, and one or more applications 123 processing on the SST core 110 using the OS platform. The device 130, optionally, includes a secure storage 131 having a security key 132 and a device identifier 133 (for the device 130). It is noted that although the device validator 121 is depicted in the SST core 110 as being outside the OS 120, in many cases explained herein it is part of OS 120; such that the device validator 121 is considered to be part of the OS 120.

When the device 130 is coupled to the SST core 110 through the device port 124, the OS 120 is notified or detects this event using the device validator 121. The mechanism for the OS 120 to discover or receive the event remains unchanged herein. The OS 120 is an enhanced OS 120 because the typical device validator is replaced with the device validator 121.

In an embodiment, the event detected by the OS 120 includes the device identifier 133 with the event, such that the OS 120 does not have to query the device 130 for its device identifier 133.

In an embodiment, the device validator 121 queries the device 131 over the device port 124 to obtain the device identifier 133.

In an embodiment, the device validator 121 sends a query to the device 130, which the device 130 supplied back to the device validator 121 in an encrypted format. That is, the device validator 121 may issue a "hello" message and the device 130 receives the message and uses its security key 132, from secure storage 131, to encrypt the "hello" message, which is then sent back to the device validator 121 for validation. Alternatively, the encrypted response may be the device identifier 133. It may also be that the device validator 121 initially sends the "hello" message in an encrypted format and the device 130 uses the security key 132 to decrypt that message and send the decrypted version back to the device validator 121. This processing ensures that the device 130 is capable of passing a security check of the SST core 110 and as enforced by both the device validator 121 and the device 130. It is also noted that other cryptology-based mechanism can be used between the device validator 121 and the device 130, without departing from the teachings of this embodiment. Security is of particular concern when the SST 100 is an Automated Teller Machine (ATM).

Moreover, it may be that no cryptology is used at all between the device validator 121 and the device 130. In this scenario, the device 130 responds to a request with a serial number or part number, which can also be checked against another list of serial numbers or part numbers maintained by the device validator 121.

Once the device validator 121 has the device identifier 133 and, optionally, has assured itself that the device 130 is authenticate (such as through the cryptology embodiment discussed above or a non cryptographic approach (also discussed above)), then the device validator is in a configured position to determine whether an application 123, processing on the SST core 110 and in the processing environment of the OS 120, can be provided access to the device 130.

So, the device validator 121 checks the device identifier 133 against the device valid identifiers 122, which are controlled by the device validator 121. In an embodiment, the device valid identifiers 122 represent a "white" list of known device identifiers for devices that are permitted to be interfaced and coupled to the SST core 110 through the device port 124.

When the device validator 121 matches the device identifier 133 to one of the device valid identifiers, then the device validator silently and transparently grants permission to the application 123 for using the device 130. That is, there is no affirmative action request made to the application 123, which requires the application 123 to positively take some action to grant the device 130 or deny the device 130 access to the SST core 110. The application 123 need not perform any action to assure access to the device 130, the device validator 121 performs the necessary validation of and automatic access to the device 130 on behalf of the application 122. Thus, if the application 123 is unattended (no user interacting with the application 123 on the SST core 110 or no actual running instance up and running on the SST core 110), the device 130 validation and permissions are set by the device validator 121. Moreover, should the application 123 need to be updated or upgraded for any reason, the update or upgraded application 123 will not be subsequently required to provide permission to access the device 130, since this is managed on behalf of the application 123 by the device validator 121.

When the device validator 121 determines either that: the device identifier 133 is unmatched in the device valid identifiers or the device 130 was unable to pass an authentication procedure (discussed above), the device validator 121 silently and transparently (the processing unknown to and requiring no action from the application 123) denies or rejects access to the device 130 on the SST core 110. So, the application 123 is unaware that the device 130 is even present on the SST core 110.

Many applications that run on SSTs may be automated or semi-automated, such that the convention approach to peripheral device verification and access are problematic because the applications may need to affirmatively take some action before the OS 120 permits the applications to continue processing or to be updated or upgraded. These problems are eliminated by the techniques discussed herein. That is, secure authentication of a device 130 can take place and access to the SST core 110 determined without any input being required from the application 123 (this is achieved through the device validator 121).

In an embodiment, the SST 100 is an ATM.

In an embodiment, the SST 100 is a kiosk.

In an embodiment, the OS 120 is an enhancement to an open source OS, such as, but not limited to: Android®, Tizen®, Unix®, Suse®, Linux®, etc.

In an embodiment, the OS 120 is an enhancement to a proprietary OS, such as, but not limited to: Windows®, iOS®, Blackberry®, etc.

In an embodiment, the device validator 121 replaces an OS's device validation module.

In an embodiment, the device validator 121 acts as a proxy to an OS's device validation module to intercept and perform the processing discussed above with the device validator 121. In this embodiment, the device validator 121 may or may not be part of the actual OS 120.

In an embodiment, the device port 124 is one of: an Ethernet port connection, a Universal Serial Bus (USB) port connection, a coaxial cable port connection, a secure digital (SD) card slot connection, and a wireless transmitter and receiver enabled port connection.

In an embodiment, the device 130 is one of: a USB device, a SD card, and any processing and/or memory enabled device having a port connector to interface with the device port 124.

In an embodiment, the device is one of: a dispenser to dispense currency or other valuable media, a printer for printing receipts, a card reader for reading consumer cards, a monitor for presenting information on screens of a display associated with the SST 100, an encrypted PINpad for encrypting consumer passwords or Personal Identification Numbers (PINs) entered on an input device of the SST 100, and a keypad as an input device to the SST 100.

In an embodiment, the device valid identifiers 122 include a variety of information organized in a table as records. Each record including a vendor identifier and a device identifier. In some embodiments, each record can include a variety of additional information, such as but not limited to: a device serial number, descriptive information for a device, a reference to an authentication procedure and/or key(s) to use for that authentication procedure, a reference to logging or auditing procedures, and the like.

Figure 2:
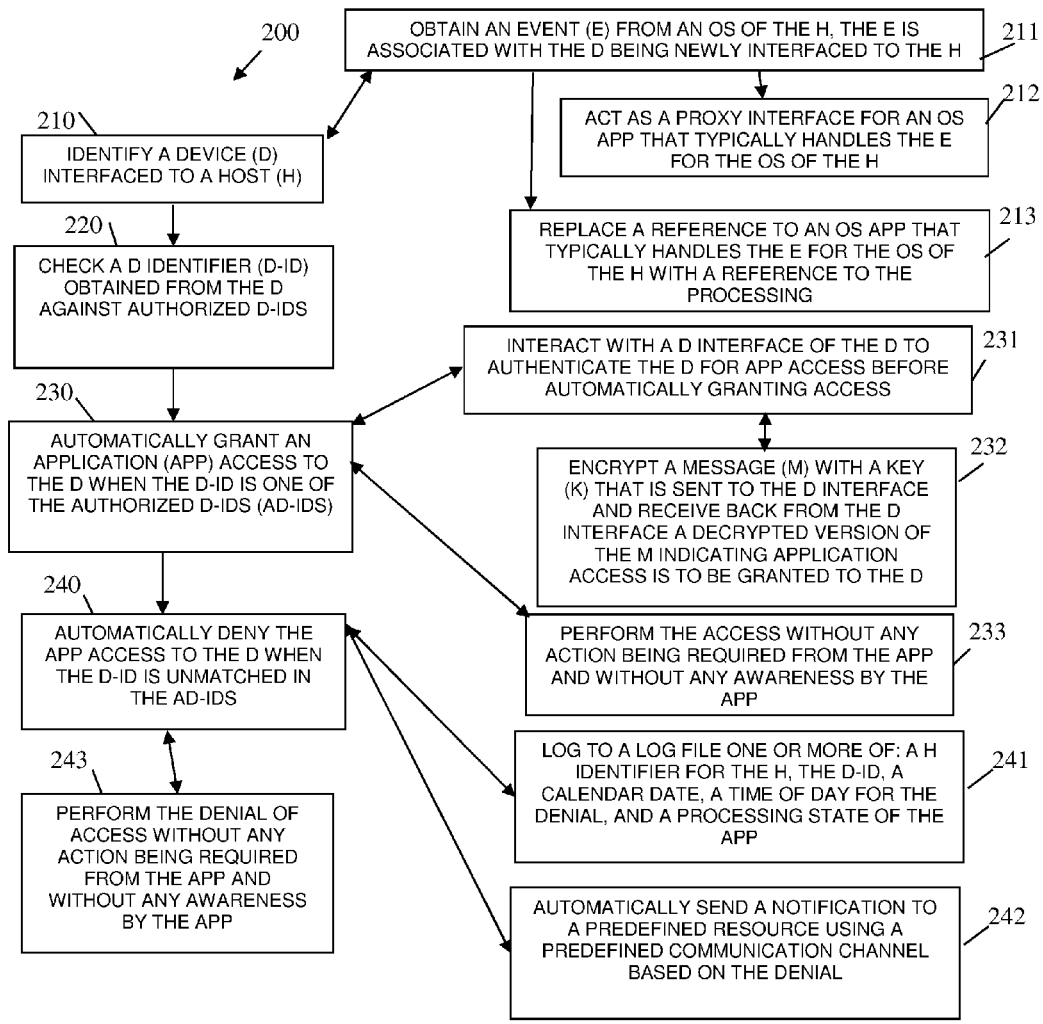
FIG. 2 is a diagram of a method for unattended secure device authorization on a host device, according to an example embodiment.
Figure 3:
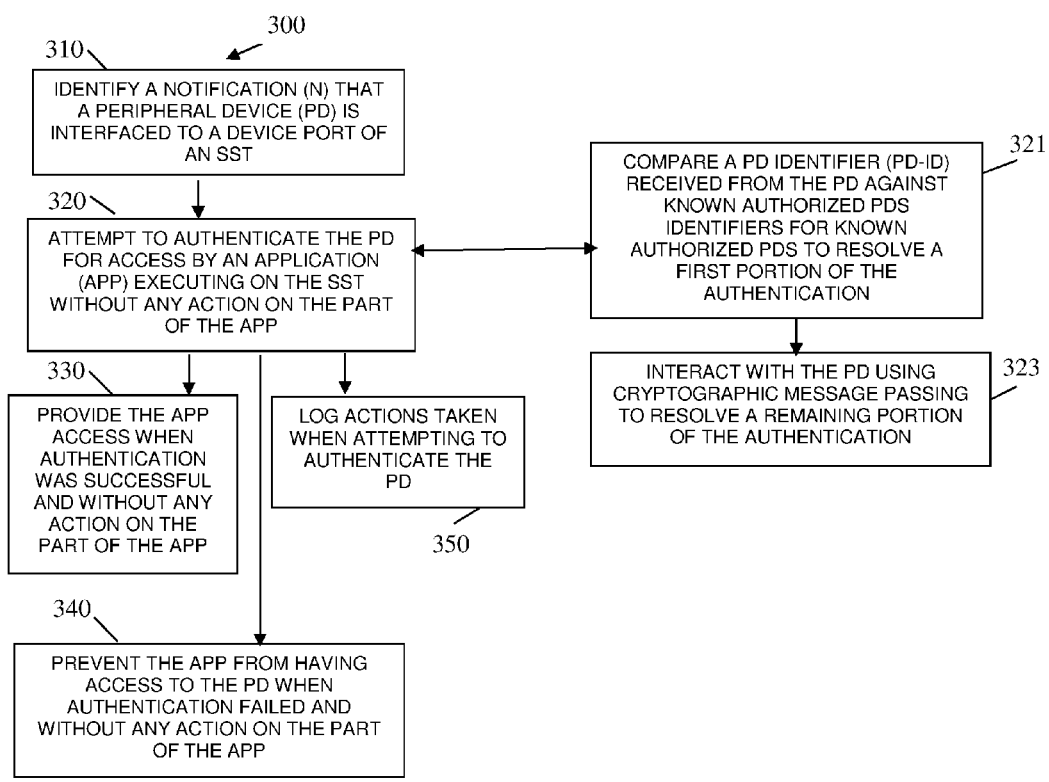
FIG. 3 is a diagram of a method for unattended secure device authorization on a SST, according to an example embodiment.
Figure 4:
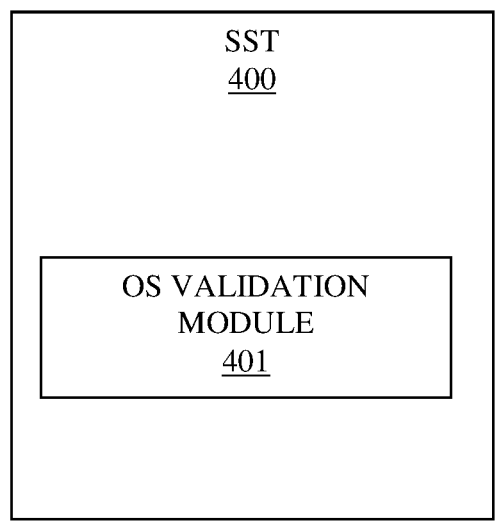
FIG. 4 is a diagram of an SST, according to an example embodiment.

Some of the above-discussed embodiments and other embodiments of the invention are now presented with the discussions of the FIGS. 2-4.

FIG. 2 is a diagram of a method 200 for unattended secure device authorization on a host device, according to an example embodiment. The software module(s) that implements the method 200 is referred to as an "authenticator." The authenticator is implemented as executable instructions programmed and residing within memory and/or a non-transitory computer-readable (processor-readable) storage medium and executed by one or more processors of a device. The processors of the device that executes authenticator are specifically configured and programmed to process the authenticator. The authenticator has access to one or more networks during its processing. The networks can be wired, wireless, or a combination of wired and wireless.

In an embodiment, the device that executes the authenticator is the SST 100 of the FIG. 1.

In an embodiment, the device that executes the authenticator is an ATM.

In an embodiment, the device that executes the authenticator is any processor-enabled device.

For purposes of discussion of the FIG. 2, the device that executes the authenticator is referred to as a "host device" or "host." It is a host because a peripheral device is attempting to connect to the host for access on the host by one or more applications that execute on the host. It is to be noted, that the host can be any device discussed in the aforementioned embodiments.

In an embodiment, the authenticator is an enhanced version of the device validator 121 of the FIG. 1.

At 210, the authenticator identifies a device interfaced to the host. The interface can be a wired connection though a hardware port of the host that the device is coupled to. Alternatively, the interface can be a wireless connection through a wireless transceiver port that receives and transmits wireless communications from the host device (the device having a transceiver as well).

According to an embodiment, at 211, the authenticator obtains an event from an OS of the host. The event is associated with the device being newly interfaced to the host. That is, when the device interfaces to the host, the OS detects the connected device and raises an event, which is monitored by the authenticator.

In an embodiment of 211 and at 212, the authenticator acts as a proxy interface for an OS application that typically handles the event for the OS host. Here, the authenticator intercepts communications from or is configured to know where the OS application communicates the event, and the authenticator handles the event. This may be a useful scenario when the OS application that typically handles the event is not available for modification or replacement, such that the OS application can remain unchanged for achieving the teachings presented herein.

In another embodiment of 211 and at 213, the authenticator replaces a reference to an OS application that typically handles the event for the OS of the host with a reference to the authenticator. Here, the device present module of the OS is modified to call the authenticator instead of the OS application that typically handles the event. Alternatively, the OS's device present module can be modified to change an event type produced by the OS application that typically handles the event, such that the OS application never receives an event type that it looks to process; rather, the event type is captured by the authenticator.

It may also be that the OS is an open source OS, such as Android®, and the OS application that typically handles the event is replaced by the authenticator.

At 220, the authenticator checks a device identifier obtained from the device against a list of authorized device identifiers for previously authorized devices. The device identifier may be obtained by querying an interface of the device or the device identifier may be attached or associated with the event.

At 230, the authenticator automatically grants an application, which is executing on the host, access to the device when the device identifier of the device is one of the authorized device identifiers securely maintained by or securely accessible to the authenticator from the host.

According to an embodiment, at 231, the authenticator interacts with a device interface of the device to authenticate the device for application access before automatically granting access. So, even if the device identifier is matched to one of the authorized device identifiers, the authenticator can take additional authentication procedures to ensure the device is authorized to be accessed by the application on the host.

In an embodiment of 231 and at 232, the authenticator encrypts a message with a key, and the encrypted message is sent to the device interface. The authenticator then receives, from the device interface, a decrypted version of the encrypted message, which was sent from the authenticator. When the decrypted received message matches the message that the authenticator had originally encrypted, then access is granted and the authenticator considers authentication to have passed; the application is provided access to the device.

In an embodiment, at 233, the authenticator performs the access on behalf of the application, without any action being required from the application and without any awareness by the application of the processing performed by the authenticator.

At 240, the authenticator automatically denies the application access to the device when the device identifier is unable to be matched or unmatched in the authorized device identifiers.

In an embodiment, at 241, the authenticator logs to a log file on the host or on a secure server accessible to the host one or more of: a host identifier for the host, the device identifier, a calendar date for the denial, a time of day for the denial, and a processing state of the application. Such information may prove useful for subsequent analysis to identify if there are patterns for the application state and types of hosts when unauthorized devices are trying to connect to the host device.

In an embodiment, at 242, the authenticator automatically sends a notification to a predefined resource using a predefined communication channel based on the denial. In other words, policy conditions evaluated by the authenticator can dictate that a person receives an email notice or that a reporting application receives the notice via an Application Programming Interface (API). The policy conditions can be configured in the authenticator or acquired from a file by the authenticator, such that they can dynamically change as needed.

In an embodiment, at 243, the authenticator performs the denial of access without any action being required from the application and without any awareness by the application.

One now fully appreciates how OS messages that require application attention to accept or deny can be achieved in a secure manner without such attention (unattended).

FIG. 3 is a diagram of a method 300 for unattended secure device authorization on a SST, according to an example embodiment. The software module(s) that implements the method 300 is referred to as an "OS device validator." The OS device validator is implemented as executable instructions programmed and residing within memory and/or a non-transitory computer-readable (processor-readable) storage medium and executed by one or more processors of a SST. The processors of the SST that executes the OS device validator are specifically configured and programmed to process the OS device validator. The OS device validator has access to one or more networks during its processing. The networks can be wired, wireless, or a combination of wired and wireless.

In an embodiment, the SST that executes the OS device validator is an ATM.

In an embodiment, the SST that executes the OS device validator is the SST 100 of the FIG. 1.

In an embodiment, the SST that executes the OS device validator is a kiosk.

In embodiment, the OS device validator is an enhanced version of the device validator 121 of the FIG. 1.

At 310, OS device validator identifies a notification that a peripheral device is interfaced to a device port of the SST. Mechanisms for identifying the notification were discussed above with reference to the FIGS. 1-2.

At 320, the OS device validator attempts to authenticate the peripheral device for access by an application executing on the SST, this is done without any action being required on the part of the application (unattended validation).

In an embodiment, at 321, the OS device validator compares a peripheral device identifier for the peripheral device and received from the peripheral device against known authorized peripheral device identifiers for known authorized peripheral devices in order to resolve a first portion of the authentication.

In an embodiment of 321 and at 322, the OS device validator interacts with the peripheral device (such as through a peripheral device interface) using cryptographic message passing to resolve a remaining portion of the authentication.

According to an embodiment, at 330, the OS device validator provides the application access when authentication was successful. Again, this is done without any action being required on the part of the application (unattended access).

In an embodiment, at 340, the OS device validator prevents the application from having access to the peripheral device when the authentication failed; the denial achieved without any action being required on the part of the application.

In an embodiment, at 350, the OS device validator logs the actions that the OS device validator took when attempting to authenticate the peripheral device.

FIG. 4 is a diagram of an SST 400, according to an example embodiment. The components of the SST 400 are programmed and reside within memory and/or a non-transitory computer-readable medium and execute on one or more processors of the SST 400. The SST 400 has access and can communicate over one or more networks; and the networks can be wired, wireless, or a combination of wired and wireless.

The SST 400 includes an OS validation module 401.

In an embodiment, the SST 400 is an ATM.

In an embodiment, the SST 400 is a kiosk.

In an embodiment, the SST 400 is the SST 100 of the FIG. 1.

The SST 400 includes one or more processors, memory, non-transitory computer-readable storage media, an OS executing on the hardware components of the SST 400, a communication port for interfacing to peripheral devices, and the OS validation module 401.

The OS validation module 401 is configured or operable to execute on one or more processors of the SST 400 and identify a connected device (such as a peripheral device) to a communication port of the SST 401. The OS validation module 401 is also configured or operable to authenticate the connected device for access by an application executing on the SST 400; the authentication achieved without any action by the application (unattended authentication).

According to an embodiment, the OS validation module 401 is further configured or operable to compare a connected device identifier for the connected device against a white list of authorized device identifiers for authorized devices for a potential match in order to resolve authentication.

In an embodiment, the OS validation module 401 is further operable to query the connected device with an encrypted message and receive back from the connected device a decrypted message that the OS validation module 401 validates to resolve the authentication.

In an embodiment, the OS validation module 401 is part of an open source OS (such as Android®) and the OS validation module 401 is an enhancement to or a replacement of an existing device validation module of that OS.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
    identifying, by an operating system (OS) device validator executing on a Self-Service Terminal (SST), a notification that a peripheral device is interfaced to a device port of the SST; and
    authenticating, by the OS device validator, the peripheral device for access by an application executing on the SST without any action on the part of the application, wherein authenticating further includes sending an encrypted "hello" message to the peripheral device decrypting the encrypted hello message at the peripheral device by using a security key of the peripheral device and receiving a decrypted response back from the peripheral device with the decrypted response including a device identifier for the peripheral device and comparing, by the OS device validator, the device identifier obtained from the decrypted response against a white list of valid device identifiers for valid peripheral devices that can service the application within an OS of the SST.

2. The method of claim 1 further comprising, providing, by the OS device validator, the application access when authentication was successful and without any action on the part of the application.

3. The method of claim 1 further comprising, preventing, by the OS device validator, the application from having access to the peripheral device when authentication failed and without any action on the part of the application.

4. The method of claim 1 further comprising, logging, by the OS device validator, actions taken by the OS device validator when attempting to authenticate the peripheral device.

5. A Self-Service Terminal (SST), comprising:
a device comprising a secure storage having a security key and device identifiers;
an SST core wherein the SST core comprising an operating system (OS) validator module and one or more applications processing on the SST core, wherein the operating system (OS) validation module operable to:
(i) execute on one or more processors of the SST,
(ii) identify a connected device to the SST, and
(iii) authenticate the connected device for access by an application executing on the SST within an OS of the SST and without any action by the application by the OS validation module sending an encrypted "hello" message to the connected device decrypting the encrypted hello message at the connected device by using the security key of the connected device and the OS validation module receiving a decrypted response back from the connected device that includes a device identifier for the connected device, and wherein the OS validation module is further configured to obtain the device identifier from the decrypted response and determine whether the device identifier is present in a white list of valid device identifiers for the application to access the connected device from the OS of the SST.

6. The SST of claim 5, wherein the SST is an ATM and the OS executing on the ATM includes the OS validation module, wherein the OS is an open source OS, and wherein the OS validation module is an enhancement to or a replacement for an existing validation module of the OS.

\* \* \* \* \*